United States Patent
Suzumura

[19]

[11] Patent Number: 6,128,567
[45] Date of Patent: Oct. 3, 2000

[54] ANTILOCK BRAKE CONTROL DEVICE IN PRESSURE REDUCTION MODE

[75] Inventor: Michiaki Suzumura, Hamakita, Japan

[73] Assignee: Nisshinbo Industries, Inc., Tokyo

[21] Appl. No.: 09/087,895

[22] Filed: Jun. 1, 1998

[30] Foreign Application Priority Data

Jun. 4, 1997 [JP] Japan ..................................... 9-161838

[51] Int. Cl.$^7$ ................................................. B60T 10/00
[52] U.S. Cl. ................................. 701/71; 701/74; 701/78; 701/79; 180/197; 303/156; 303/157; 303/158; 303/163
[58] Field of Search .................................. 701/71, 74, 78, 701/79; 180/197; 303/156, 157, 158, 163

[56] References Cited

U.S. PATENT DOCUMENTS 5,504,680 4/1996 Yamashita et al. ................. 364/426.03
5,557,523 9/1996 Yeh et al. ........................... 364/424.03

FOREIGN PATENT DOCUMENTS 0 470 657 A2 2/1992 United Kingdom.

*Primary Examiner*—William A. Cuchlinski, Jr.
*Assistant Examiner*—Ronnie Mancho
*Attorney, Agent, or Firm*—Arent Fox Kintner Plotkin & Kahn, PLLC

[57] ABSTRACT

An antilock brake control device of this invention includes a electronic control device 30 to operate antilock brake control and the hydraulic unit 20 which operates by a control signal from the electronic control device 30, wherein the maximum target amount of slip is preset, the rate of pressure reduction is determined so as to vary the amount of slip along a quadratic curve which regards the predetermined maximum target amount of slip as a extreme value, and the fluid pressure of the wheel cylinder is reduced at the rate of pressure reduction.

8 Claims, 5 Drawing Sheets

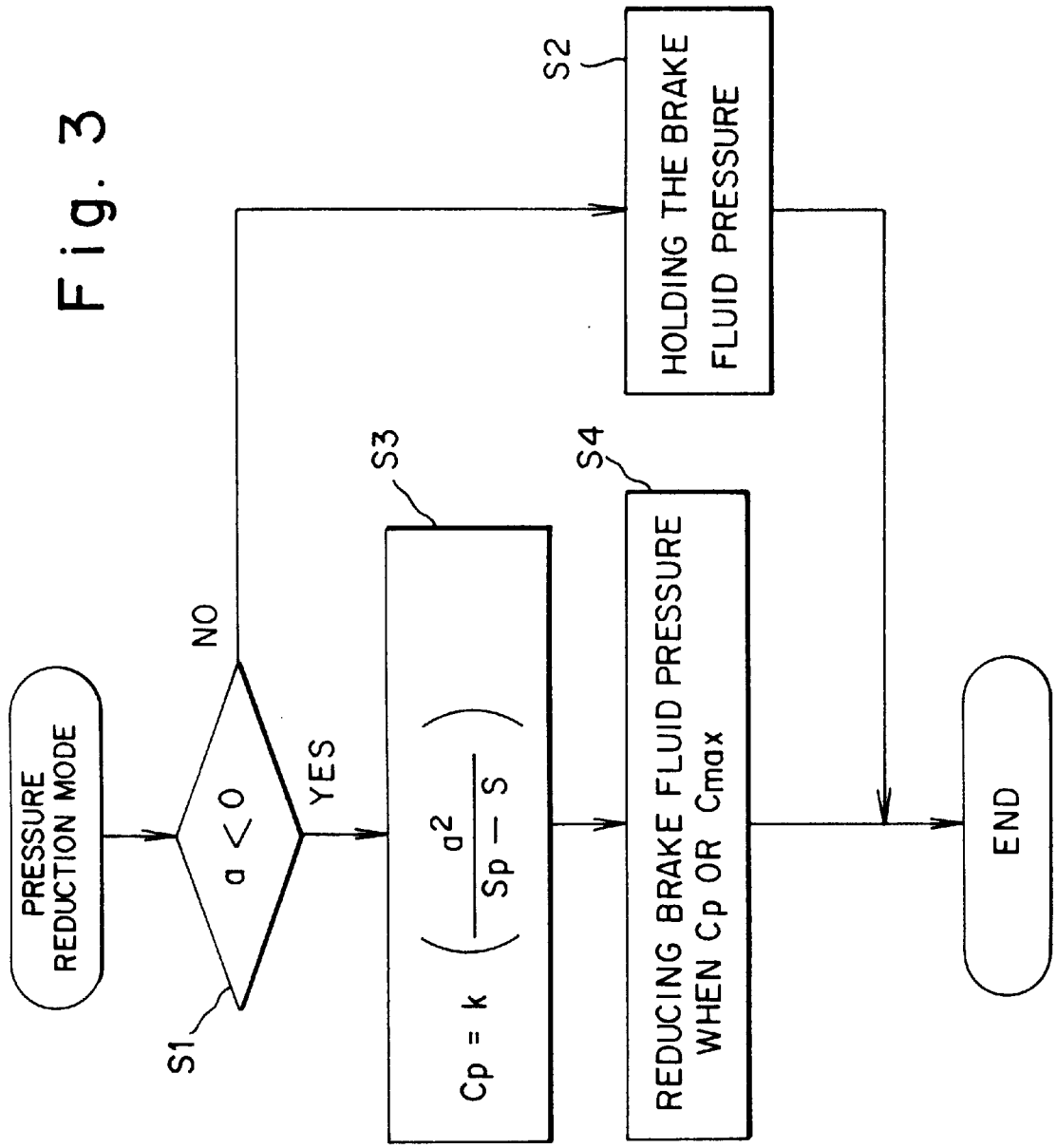

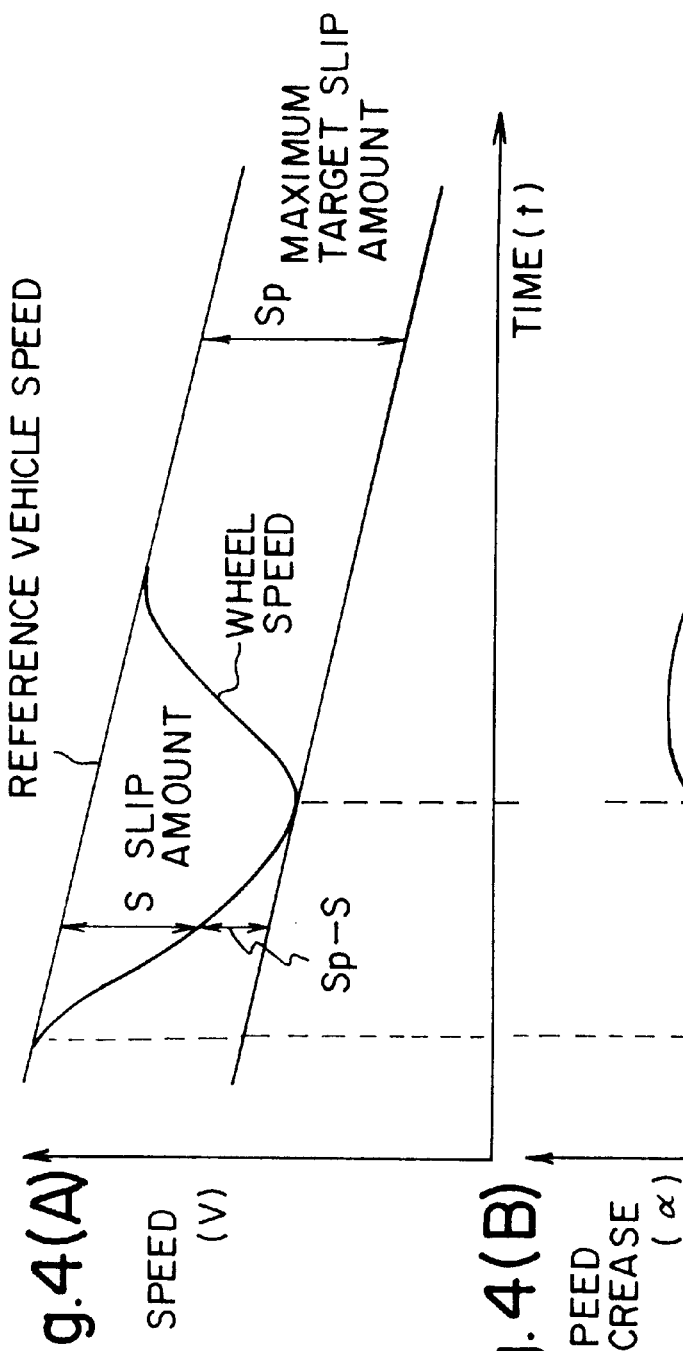

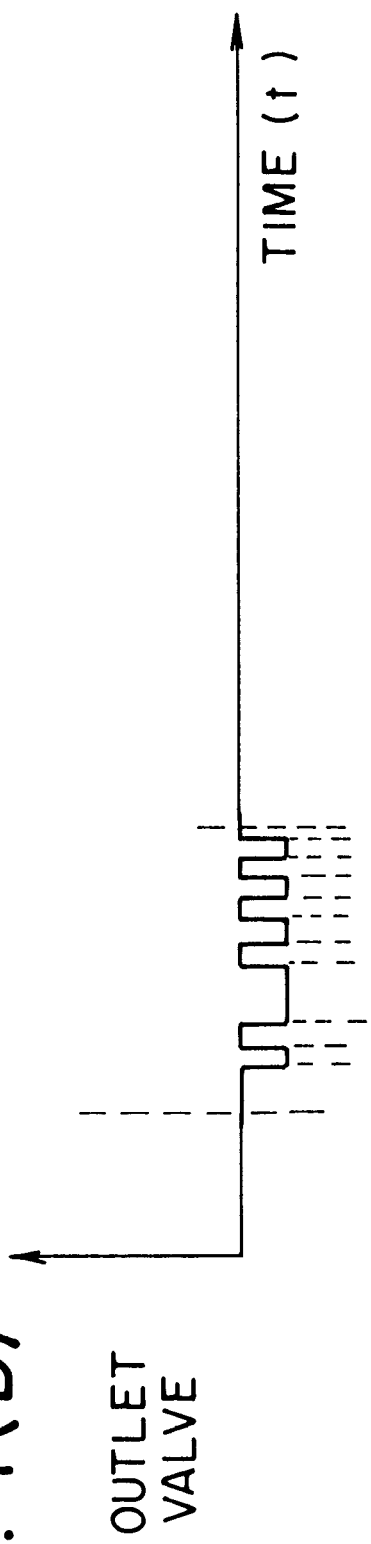
Fig. 4(D) OUTLET VALVE
Fig. 4(E) BRAKE FLUID PRESSURE

ANTILOCK BRAKE CONTROL DEVICE IN PRESSURE REDUCTION MODE

BACKGROUND OF THE INVENTION

This invention relates to a vehicle antilock brake control device and more particularly, to a vehicle antilock brake control device suited for pressure reduction mode operations.

In a conventional antilock brake control device, the device begins a control mode (pressure reduction mode) to release brake fluid pressure of the wheel cylinder when the device senses an indication of a wheel being locked. The indication of a wheel being locked can be determined from one of several situations, such as when the amount of wheel slip of a particular wheel goes beyond a predetermined threshold value or when a deceleration (i.e., negative acceleration) of the wheels goes beyond a predetermined threshold value. When the device senses such an indication, pressure reduction mode begins and the amount of time for pressure reduction is determined with the maximum target rate of pressure reduction speed based on the amount of wheel slip and the wheel deceleration, and then fluid pressure of the wheel cylinder is reduced.

However, the above-described conventional devices have the following disadvantages.

A relationship which determines the rate of pressure reduction from the amount of wheel slip and the wheel deceleration requires repeating a large number of experiments to obtain the necessary data to determine the relationship and requires an enormous amount of time and expense. Also, the relationship determined as such tends to lack logical consistency. Procedures to put this relationship into practice tend to include many complicated problems which can be very difficult.

OBJECT AND SUMMARY OF THE INVENTION

An object of the invention is to provide an antilock brake control device which when in a pressure reduction mode, facilitates a determination of the most appropriate rate of pressure reduction.

The present invention is an antilock brake control device which comprises an electronic control device and a hydraulic device operating by control signals from the electronic control device, wherein, when in a pressure reduction mode, a maximum target slip amount is set in advance, a rate of pressure reduction varying the amount of slip according to a quadratic curve which regards the predetermined maximum target amount of slip as a polar value is determined, and fluid pressure of a wheel cylinder at the determined pressure reduction speed is reduced.

The invention further is an antilock brake control device in a pressure reduction mode as above, wherein the rate of pressure reduction is determined by Formula 1, $$C_P = k\left(\frac{a^2}{S_P - S}\right) \quad (1)$$

wherein $C_P$ represents the rate of pressure reduction, $a$ represents the degree of the wheel acceleration, $S_P$ represents the predetermined maximum target amount of slip, and $S$ represents a current amount of slip.

The invention still further is an antilock brake control device in a pressure reduction mode as above, wherein the predetermined maximum target amount of slip is set to be a little bit higher than an amount of slip which maximizes wheel frictional resistance.

The invention yet further is an antilock brake control device when in the pressure reduction mode as above, wherein when the determined rate of pressure reduction is more than maximum pressure reduction speed within an ability of the antilock brake device, fluid pressure at a wheel cylinder is reduced with the maximum pressure reduction speed.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3 is a flow chart of a pressure reduction mode operation according to the present invention; and FIGS. 4(A)–(E) are the components of a time chart of a pressure reduction mode operated according to the present invention.

DETAILED DESCRIPTION OF PREFERRED EMBODIMENT

An embodiment of this invention is explained next with reference to diagrams.

Figure 1:
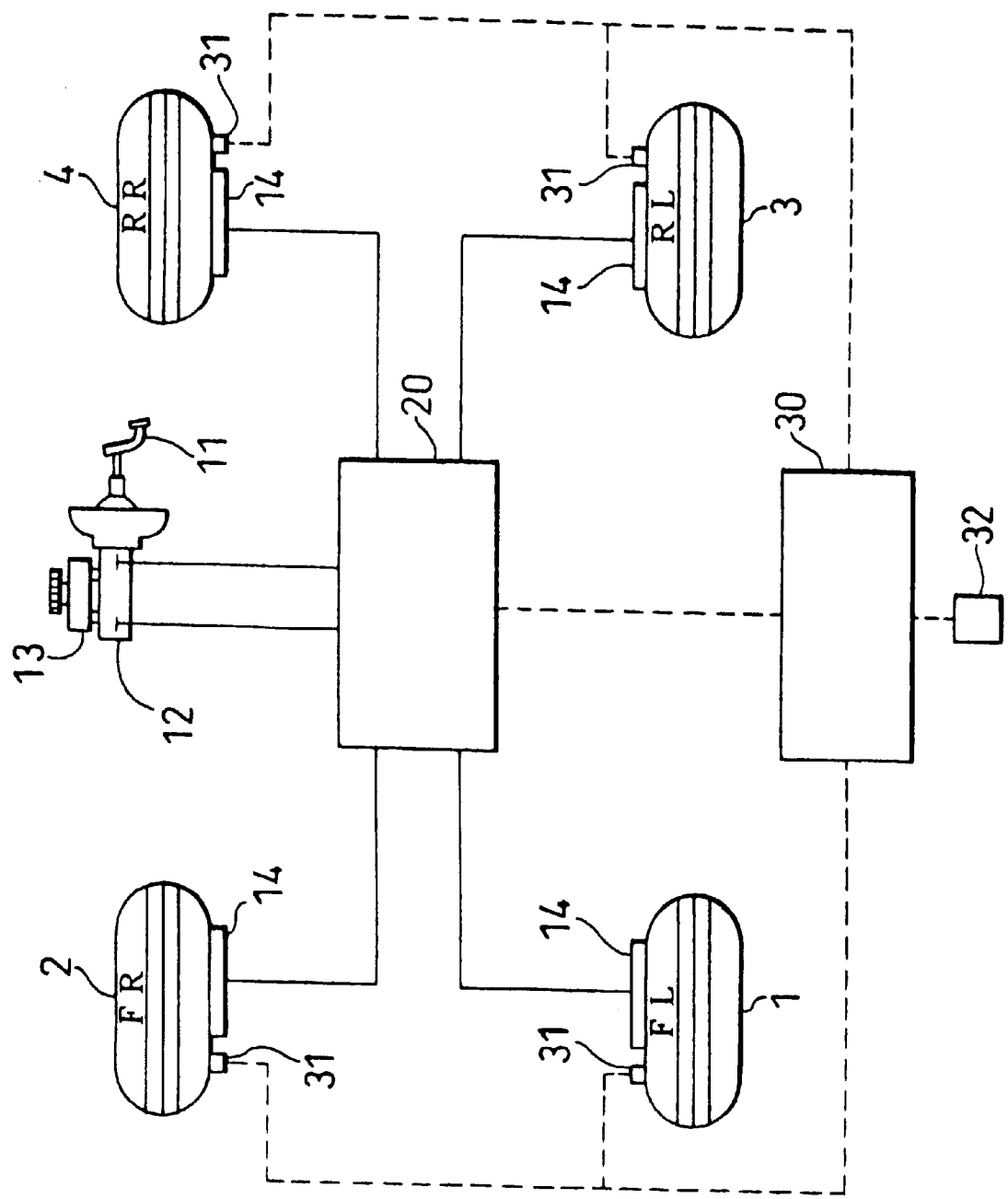
FIG. 1 is an explanation diagram of a brake system of a vehicle.

An antilock brake control device is generally equipped with an electronic control device to operate antilock brake control and a hydraulic device (hydraulic unit) which operates based on control signals from the electronic control device. For instance, as shown in FIG. 1, hydraulic fluid lines for fluid pressure produced by operation of the brake pedal 11 connected to the main reservoir 13 and the master cylinder 12 are connected with the wheel brake cylinders 14 of each wheel (front left wheel 1, front right wheel 2, rear left wheel 3, rear right wheel 4) via the hydraulic unit 20.

In an antilock brake control device, when braking is applied, the hydraulic unit 20 is controlled by signals from the electronic control device 30 receiving signals from the wheel speed sensors 31 and the G sensor 32 in order to operate the most appropriate brake control. The electronic control device 30 has ordinary computer parts such as microcomputer and is readily programmable by those of skill in the art to accomplish the functions and operations detailed further herein.

Figure 2:
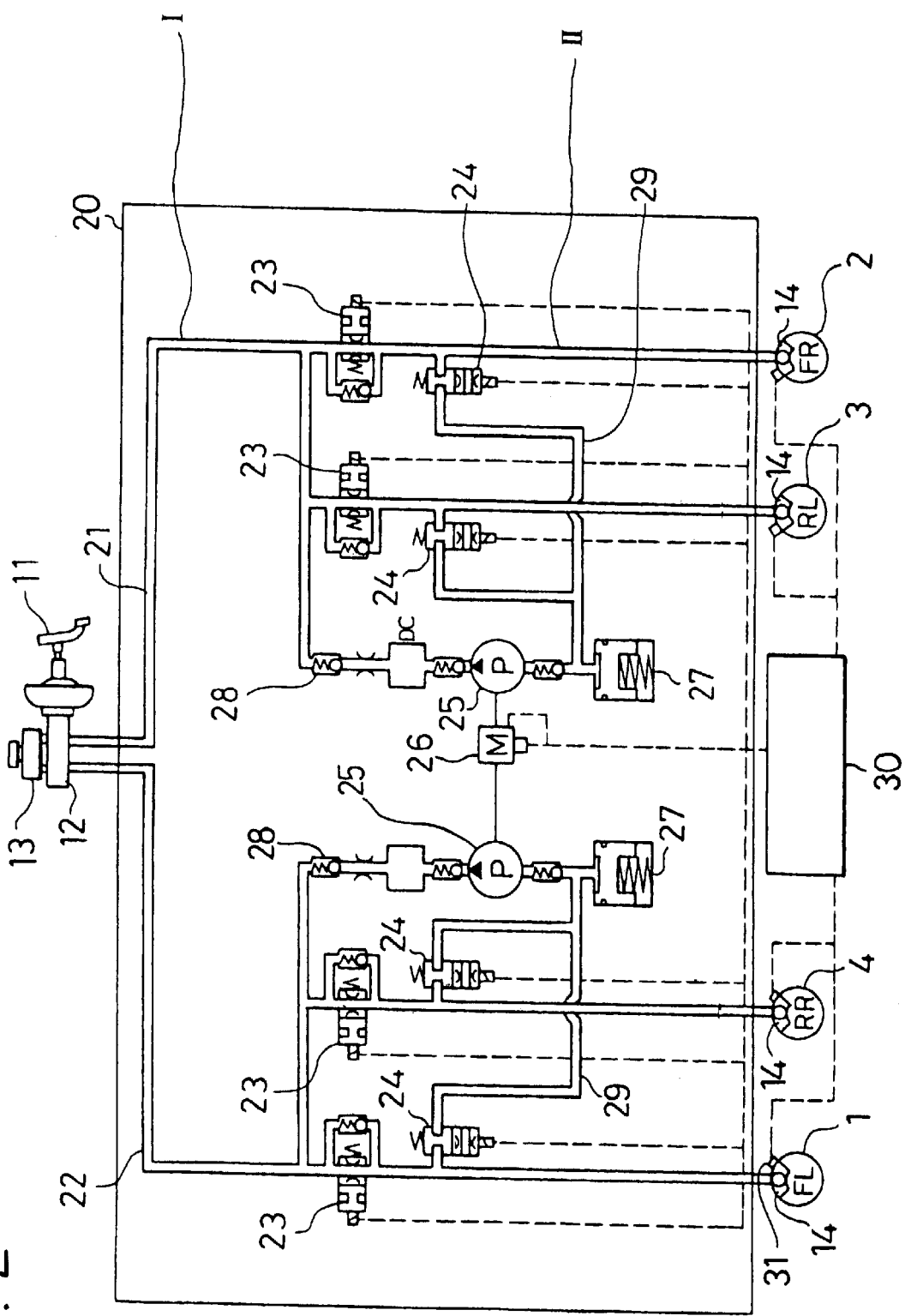
FIG. 2 is an explanation diagram of a hydraulic unit.

In an example of the X-pipe type arrangement of specific hydraulic fluid connections as shown in FIG. 2, the hydraulic unit 20 is equipped with the first hydraulic circuit 21 and the second hydraulic circuit 22, which connect the master cylinder 2 with the wheel cylinders 14. The first hydraulic circuit 21 and the second hydraulic circuit 22, both comprise the main hydraulic lines of the first main hydraulic line I and the second main hydraulic line II having the inlet valve 23 between them, the outlet valve 24 from the main hydraulic line II, the auxiliary reservoir 27, the pump 25, the damping chamber DC, and the returning line 29 returning to the main hydraulic line I via the reverse stopper valve 28.

Operation of the antilock brake control device is explained next.

In normal brake control, when the brake pedal is pressed, brake fluid pressure is produced at the master cylinder 12, and the inlet valves 23 are maintained opened while the outlet valves 29 are maintained closed. Accordingly, brake fluid pressure produced at the master cylinder 12 is directly transmitted to the wheel cylinders 14, which brakes the wheels.

For antilock brake control, the electronic control device 30 detects the wheel condition by signals from the wheel speed sensors 31, etc. and calculates the amount of wheel slip, the wheel deceleration, etc. for each wheel. When the braking begins to be affected and the wheels begin to be locked, antilock brake control takes place including opening and closing control of the inlet valves 23 and the outlet valves 24, operation control of the pump 25 by the motor 26, etc.

For instance, in the pressure reduction mode (control mode), when the amount of wheel slip goes beyond the predetermined threshold amount or the wheel deceleration goes beyond the predetermined threshold amount, the inlet valve 23 is closed while the outlet valve 24 is opened, and the brake fluid of the wheel cylinder 14 flows to the returning line 29 to weaken the braking force on the wheels.

When in a pressure reduction mode, the electronic control device 30 is used to control the braking by determining the rate of brake fluid pressure reduction $C_P$ for the amount of slip S to control it to become the predetermined maximum target amount slip $S_P$. The maximum target amount slip $S_P$ is to be a maximum slip amount which provides the most appropriate braking effect. Preferably, the amount slip is to be slightly more than the amount slip where the wheel frictional resistance $\mu$ is maximized. The maximum target amount slip $S_P$ may be set to operate appropriate antilock brake control by differentiating the amount slip of the front wheels and rear wheels, varying the slip amount depending upon the road condition, etc.

The rate of pressure reduction $C_P$ is determined by the following Formula 2. The reference sign k in Formula 2 represents a constant; the reference sign a represents the wheel acceleration; the reference sign $S_P$ represents the maximum target amount slip; and the reference sign S represents the current amount slip.

$$C_P = k\left(\frac{a^2}{S_P - S}\right) \quad (2)$$

Formula 2 is determined in part by the following Formula 3 which is an equation of motion for wheel slip. Time differential of the current amount of slip S depends upon brake fluid pressure P and the frictional resistance $\mu$ as a function of the amount of slip S. B and W are constants determined by the particular type and model of vehicle.

$$\dot{S} = B \times P(t) - W \times \mu(S) \quad (3)$$

Formula 4 is determined since brake fluid pressure P is assumed to descend in a straight line when reducing pressure. $C_P$ represents a hydraulic slope, i.e., the rate of pressure reduction, and $P_0$ represents brake fluid pressure at t=0.

$$P(t) = -C_P \times t + P_0 \quad (4)$$

Also, when reducing pressure, since slip ratio is large, it is said to be $\mu(S) = \mu_P$ (constant). Accordingly, Formula 3 becomes Formula 5.

$$\dot{S} = -B \times C_P \times t + B \times P_0 - W \times \mu_P \quad (5)$$

When t=0 and $S=S_0$ (initial amount of slip), the solution of Formula 5 is Formula 6.

$$S = -\tfrac{1}{2} B \times C_P \times t^2 + (B \times P_0 - W \times \mu_P) \times t + S_0 \quad (6)$$

Formula 6 describes a convex parabolic line on the top, and the maximum slip amount $S_P$ may be described in Formula 7.

$$S_P = \frac{(B \times P_0 - W + \mu_P)^2}{2 \times B \times C_P} + S_0 \quad (7)$$

In addition, the time differential of S may be regarded as the wheel deceleration (=a), and therefore, Formula 5, when t=0, becomes Formula 8.

$$\dot{S} = -a = B \times P_0 - W \times \mu_P \quad (8)$$

Moreover, when 2B=1/k, Formula 7 applying Formula 8 becomes the following Formula 9.

$$S_P = \frac{a^2}{C_P/k} + S_0 \quad (9)$$

Accordingly, the maximum amount slip $S_P$ is determined by the current value (t=0), the wheel acceleration a, the initial amount of slip $S_0$, and the rate of pressure reduction $C_P$. Then, the rate of pressure reduction $C_P$ is to be the following Formula 10 by modifying Formula 9.

$$C_P = k\left(\frac{a^2}{S_P - S}\right) \quad (10)$$

One example of the antilock brake control processes when in the pressure reduction mode is shown in FIG. 3. Initially, the electronic control device 30 calculates the acceleration a to determine whether the same is negative or not (S1) upon receiving signals from the wheel speed sensor 31. If not negative, the brake fluid pressure is held (S2) and the pressure reduction mode is ended.

If the acceleration a is negative, the $C_P$ is calculated (S3) by using Formula 10 in the electronic control device 30. Then, the hydraulic unit is controlled (S4) to determine the rate of pressure reduction $C_P$ in the wheel cylinder 14. If the rate of pressure reduction $C_P$ is greater than the maximum rate of pressure reduction $C_{max}$, pressure is to be reduced at the maximum rate of pressure reduction $C_{max}$ that the device is capable to perform.

FIGS. 4(A)–(C) show one example of the time chart for antilock brake control when in a pressure reduction mode according to the present invention.

FIG. 4(A) shows that the wheel begins to slip at time $t_0$, and the wheel speed shifts from the reference vehicle speed. The difference between the reference vehicle speed and the wheel speed becomes the amount of slip S. FIG. 4(B) shows the changes of the wheel acceleration. FIG. 4(C) shows the rate of pressure reduction. When the rate of pressure reduction C goes beyond the maximum pressure reduction speed $C_{max}$, the actual pressure reduction speed is defined as the maximum pressure reduction speed $C_{max}$. FIG. 4(D) shows the opening and closing conditions of the outlet valve. FIG. 4(E) shows the changes of the brake fluid pressure.

Considering the pressure reduction mode of FIGS. 4(A)–(E), brake fluid pressure is applied to the wheels; the deceleration becomes greater; and slip is rapidly developed from time $t_0$. When the amount of slip goes beyond the slip threshold value (at $t_1$), the inlet valve is closed and the outlet valve is opened for the brake fluid pressure to be reduced, so that the rate of pressure reduction $C_P$ may be adjusted to be as determined in the step S3 of FIG. 3. At this time, the amount of slip moves along the quadratic curve of the above-mentioned Formula 6.

The $C_P$ goes beyond the maximum rate of pressure reduction $C_{max}$ when in time $t_2$–$t_3$; therefore, the outlet valve is maintained opened. When in time $t_3$–$t_4$, as in $t_2$–$t_3$, the outlet valve is controlled to be open or closed to control the rate of pressure reduction $C_P$.

This invention has the following advantages.

(A) The rate of pressure reduction, which may change the amount of slip along the quadratic curve where the predetermined maximum target amount of slip is an extreme value, may be determined by a mode such as Formula 2. Thus, the invention provides an antilock brake control device which facilitates processing. In addition, many of the experiments used to determine the rate of pressure reduction and trial and error are not necessary in this invention, and at the same time, antilock brake control may be developed in a shorter period of time with lower costs.

(B) The predetermined target amount slip is set to be slightly higher than the amount of slip where the friction resistance becomes highest. Accordingly, the wheel frictional force is effectively used to create the braking force for effective antilock brake control.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. An antilock brake control device in a pressure reduction mode which comprises an electronic control device and a hydraulic device, said hydraulic device being operated by control signals from said electronic control device, wherein a maximum target amount of slip is set in advance, a rate of pressure reduction varying an amount of slip according to a quadratic curve which regards said predetermined maximum target amount of slip as an extreme value is determined, and fluid pressure of a wheel cylinder is reduced at said rate of pressure reduction.

2. An antilock brake control device as claimed in claim 1, wherein said rate of pressure reduction is determined by the following formula $$C_P = k\left(\frac{a^2}{S_P - S}\right)$$

wherein: $C_P$ represents said rate of pressure reduction, a represents the wheel deceleration, $S_P$ represents said predetermined maximum target amount of slip, and S represents a current amount of slip.

3. An antilock brake control device as claimed in claim 1, wherein said predetermined maximum target amount of slip is set to be a little bit higher than an amount of slip which maximizes wheel frictional resistance.

4. An antilock brake control device as claimed in claim 1, wherein when the determined rate of pressure reduction exceeds maximum rate of pressure reduction ability of said antilock brake device, fluid pressure at a wheel cylinder is reduced at said maximum rate of pressure reduction.

5. A method of controlling an antilock brake control device in a pressure reduction mode, said antilock brake control device comprising an electronic control device and a hydraulic device, said hydraulic device being operated by control signals from said electronic control device, said method comprising setting a maximum target amount of slip in advance, determining a rate of pressure reduction varying an amount of slip according to a quadratic curve which regards said predetermined maximum target amount of slip as an extreme value, and reducing fluid pressure of a wheel cylinder at said rate of pressure reduction to effect the controlling.

6. A method of controlling an antilock brake control device in a pressure reduction mode as claimed in claim 5, wherein said rate of pressure reduction is determined by the following formula $$C_P = k\left(\frac{a^2}{S_P - S}\right)$$

wherein: $C_P$ represents said rate of pressure reduction, a represents the wheel deceleration, $S_P$ represents said predetermined maximum target amount of slip, and S represents a current amount of slip.

7. A method of controlling an antilock brake control device in a pressure reduction mode as claimed in claim 5, wherein said predetermined maximum target amount of slip is set to be a little bit higher than an amount of slip which maximizes wheel frictional resistance.

8. A method of controlling an antilock brake control device in the pressure reduction mode as claimed in claim 5, wherein when the determined rate of pressure reduction exceeds a maximum rate of pressure reduction ability of said antilock brake device, fluid pressure at a wheel cylinder is reduced with said maximum rate of pressure reduction.

* * * * *